Nov. 29, 1960    O. FRADD    2,961,695
SLIDING AND SWINGING HINGE
Filed Dec. 2, 1955    2 Sheets-Sheet 1
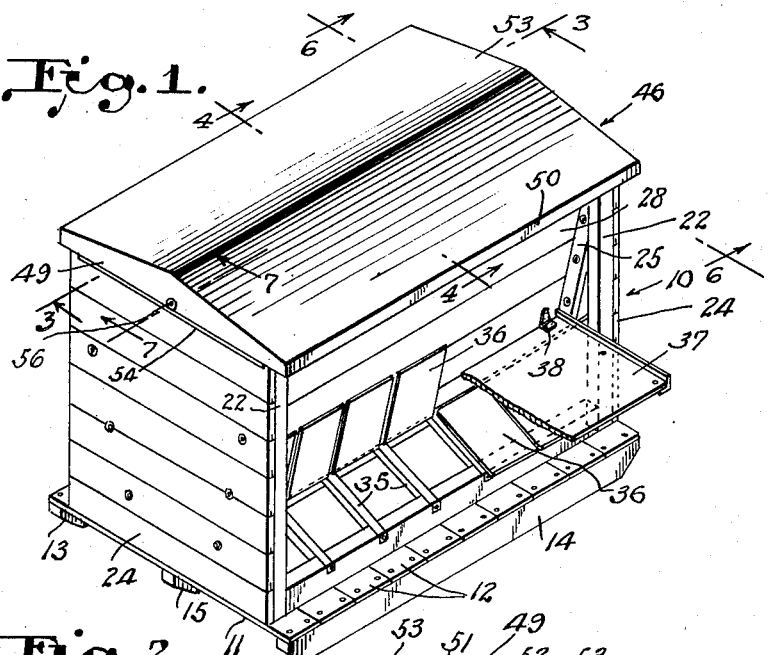
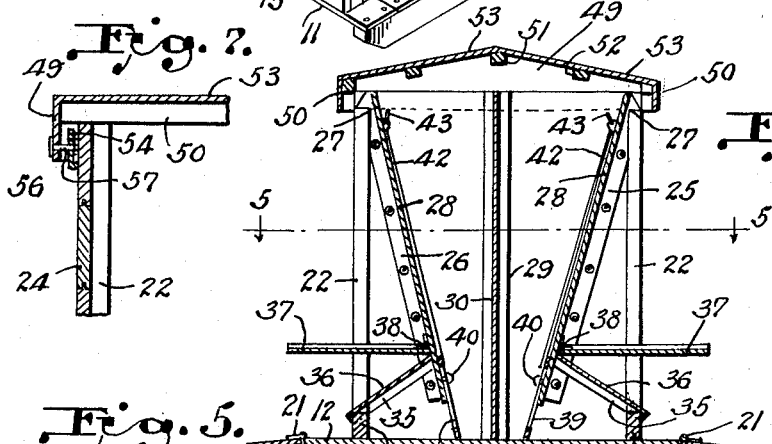
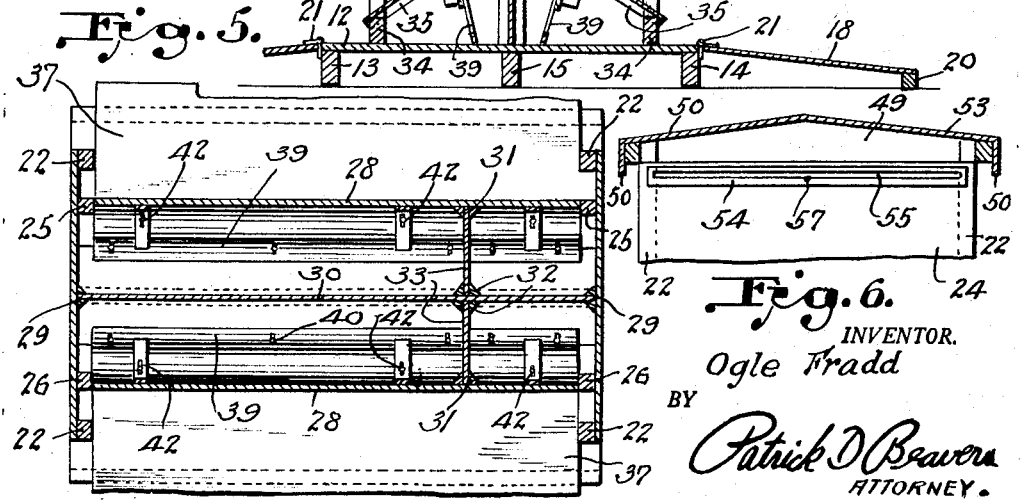
INVENTOR.
Ogle Fradd
BY
Patrick D. Beavers
ATTORNEY.

Nov. 29, 1960

O. FRADD 2,961,695

SLIDING AND SWINGING HINGE

Filed Dec. 2, 1955

INVENTOR.
Ogle Fradd
BY Patrick D. Beavers
ATTORNEY.

United States Patent Office 2,961,695
Patented Nov. 29, 1960

2,961,695
SLIDING AND SWINGING HINGE
Ogle Fradd, Rte. 1, South Solon, Ohio
Filed Dec. 2, 1955, Ser. No. 550,620
1 Claim. (Cl. 16—179)

This invention relates to improvements in animal feeders, wherein various types of feeds are placed in individual bins for the consumption of the feeds by swine of all ages and sizes.

An object of this invention is to provide a feeder that comprises separate sub-assemblies that are easily connected together to provide a unitary construction.

Another object of the invention is to provide a feeder that will permit a small pig to consume feed from certain of the bins while preventing hogs from gaining access to the bin.

A further object of this invention is to provide a feeder that is portable and easily transported to any desired location.

With the above and other objects and advantages in view, the invention consists of the novel details of construction, arrangement and combination of parts more fully hereinafter described, claimed and illustrated in the accompanying drawings in which:

Fig. 1 is a perspective view, partly in section and partly broken away, of the feeder embodying the invention without the extension platforms;

Fig. 4 is a vertical sectional view taken transversely of the feeder on the line 4—4 of Fig. 1;

Fig. 5 is a transverse sectional view in line 5—5 of Fig. 4;

Fig. 6 is a transverse sectional view on the line 6—6 of Fig. 1 of the roof and a portion of the hinge therefor; and Fig. 7 is an enlarged fragmentary detailed sectional view on the line 7—7 of Fig. 1 showing the manner of hinging the roof to the feeder.

Figure 2:
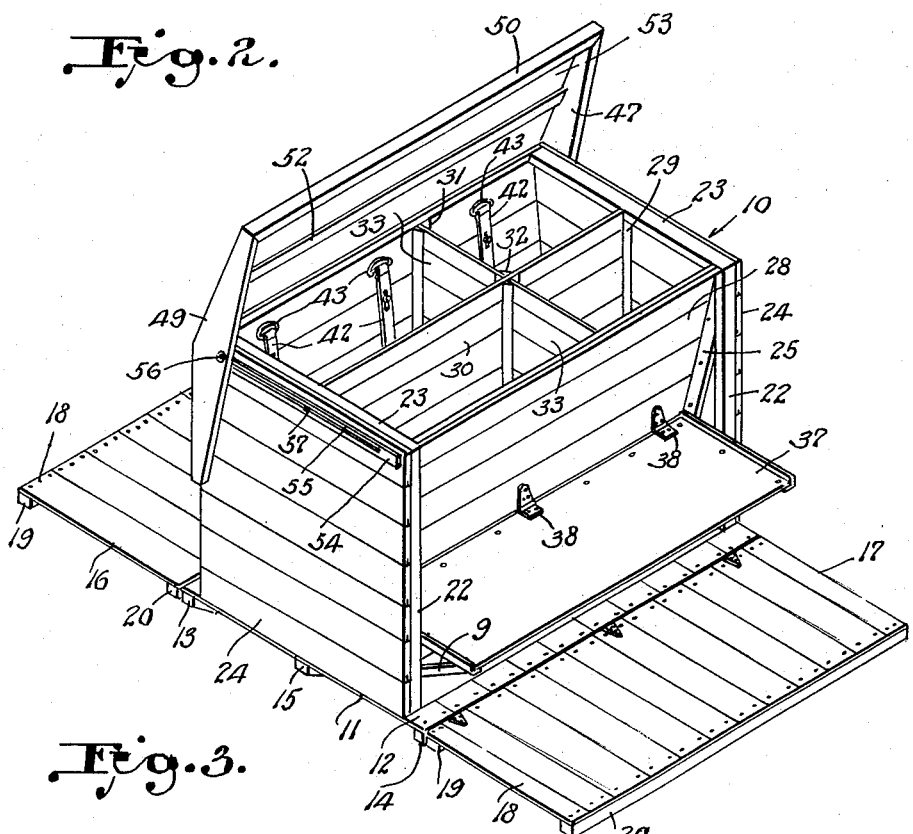
Fig. 2 is a perspective view of the feeder with the extension platforms connected thereto, the roof in open position for filling the bins with feed and with the creep guard in lowered position.

Referring more in detail to the drawings, wherein like parts are designated by like reference numerals, the reference numeral 10 is used to generally designate the animal feeder embodying the invention.

The animal feeder 10 comprises a bottom floor 11 which is constructed of a plurality of planks 12 which are secured at their opposite ends to a pair of runners 13 and 14, respectively. There is also an intermediate runner 15 that is secured to the center of the plank 12 in parallel spaced relation to the runners 13 and 14, respectively.

Extension platforms 16 and 17, respectively, consisting of a plurality of planks 18 secured at their opposite ends to runners 19 and 20, respectively, are secured to the opposite sides of the bottom 11 by a plurality of hinges 21.

A plurality of corner posts 22 is mounted on the bottom 11 in vertical relation thereto. A top rail 23 is secured to the tops of the corner posts at each end of the floor 11 and a plurality of planks 24 secured to the corner posts 22 and top rails 23 provide the ends of the feeder.

A pair of downwardly converging L-shaped supporting members 25 and 26, respectively, is secured to each end of the feeder and the upper end of each of the members 25 and 26 is cut out as at 27, to engage over the upper ends of the corner posts 22. A plurality of planks 28, secured to the members 25 and 26, completes the sides of the feeder 10.

Vertically disposed supporting means 29 is secured to each end of the feeder 10 centrally thereof to receive the longitudinally extending partition 30. Vertically disposed supporting means 31 is secured to the sides of the feeder 10 adjacent one end thereof. Alined vertically disposed supporting means 32 is secured to the each side of partition 30 and a transversely extending partition 33 is mounted between the supporting means 31 and 32 on opposite sides of the partition 30.

Longitudinally extending base boards 34 are secured at their opposite ends to the corner posts 22 in contactual relation to the floor 11. Inclined straps 35 are secured to the base boards 34 and to the sides of the feeder 10 to provide individual feeding stalls. Weatherproof lids 36 are hinged at their upper ends to the sides of the feeder 11 and in lowered position rest on the straps 35, as shown in Fig. 1.

A creep guard 37, Fig. 2, is hinged along one longitudinal edge to each side of the feeder 10 by a plurality of hinges 38. The creep guards 37 are located above the hinged ends of the lids 26, as shown in Fig. 4, and an adjustable support 9 of well known construction is provided for each end of the creep guard 37.

The lowermost plank 28 of each of the sides of the feeder 10 is spaced from the floor 11 of the feeder to permit feed to pass outwardly of the bins formed by the sides and partitions of the feeder to the feeding stalls outlined by the straps 35.

Figure 3:
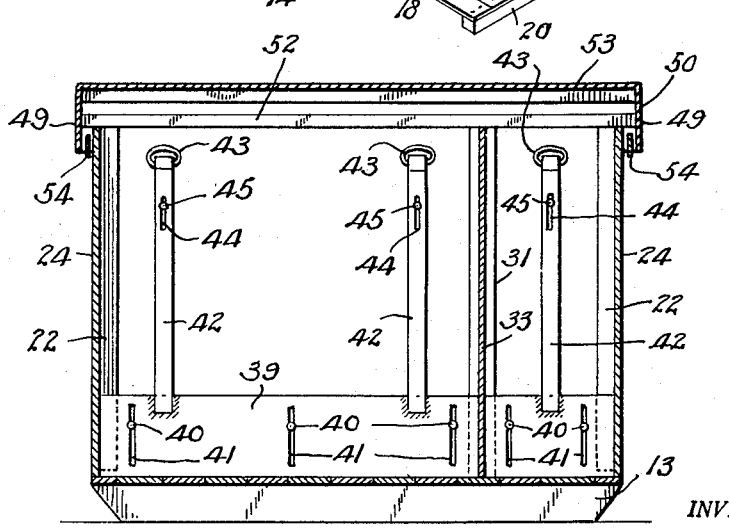
Fig. 3 is a vertical sectional view taken longitudinally of the feeder on the line 3—3 of Fig. 1.

To regulate the flow of feed into the feeding stalls, a gate 39 is slidably mounted on each side of the feeder 10 by means of bolts 40 passing through spaced elongated slots 41 in the gate 39, see Fig. 3.

A plurality of straps 42 is secured to each of the gates 39 and a handle 43 is connected to the free end of each strap 42. Each strap is provided with an elongated slot 44 to receive a fastener 45 whereby the gates are retained in various positions to regulate the amount of feed entering the feeding stalls.

A pitched roof 46 for the feeder 10 comprises a frame 47 having end pieces 49, side pieces 50, ridge 51 and intermediate beams 52 with the roof covering 53. The roof is of a size so that the sides and ends overlap the upper perimetal edge of the feeder 10.

At each end of the feeder 10, adjacent the upper edge thereof, there is mounted a hinge plate 54 having a longitudinally extending slot 55 therein, Fig. 6. A bolt 56, mounted in each end piece 49 of the roof 46 centrally thereof, is received in the slot 55 in the plate 54 so that the roof 46 can be slid and moved to open position, as shown in Fig. 2. A right angularly disposed notch 57 at the center of the slot 55 in the plate 54 permits the roof to be seated on the upper perimetal edge of the feeder and the slot 55 is at a position to permit free movement of the roof 46, as previously described and shown in Fig. 2.

The partitions 30 and 33, respectively, permit different kinds of feed to be distributed to the animals. As the animals finish eating from the stalls, the lids 36 will cover the stalls to prevent rain or debris from coming in contact with the feed in the stalls. The creep guard 37 is adjustable in height by reason of the support 9, thus small pigs may eat under this guard without hogs of larger size disturbing them. Thus, the feed of the small pigs can be carefully selected for its nutritional value without the danger of the hogs eating the feed that is meant for the small pigs.

When the creep guard is not needed, it can be moved upwardly into engagement with the side of the feeder. The extension platforms 16 and 17 are used to keep the pigs and hogs out of the mud during wet weather. When it is desired to move the feeder 10 on the runners 13, 14 and 15, the platforms 16 and 17 are swung upwardly into engagement with the sides of the feeder 10.

The amount of feed to the animals is regulated by pulling upwardly on the handles 43 connected to the straps 42 and there is nothing on the control mechanism for the feed, that will catch in the feed bags as the feed is emptied into feeder 10.

It is believed that the construction and use of the animal feeder embodying the invention will be clear to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A hinge comprising a plate of rectangular formation having straight longitudinally extending parallel side edges and straight oppositely extending parallel end edges, said plate having a horizontally disposed longitudinally extending slot therein, a notch in that portion of the plate forming one longitudinal edge of the slot with said notch communicating with said slot but not extending beyond the side edge of the plate adjacent thereto, a bolt extending through said slot and receivable in said notch, said plate attachable in pairs with one plate on each opposite end of a fixed element so that said plates are in opposed parallel relation to each other, said bolt attachable in pairs in opposed relation to each other with one bolt on each opposite end of a movable element to be hinged to said fixed element for open and closed relation thereto whereby said bolts are to be alined with said slots so that when said movable element is in closed relation to said fixed element, said bolt is receivable in said notch and when said movable element is hinged in open relation to said fixed element said bolt is receivable in either end of said slot.

References Cited in the file of this patent
UNITED STATES PATENTS

| | | |
|---|---|---|
| 131,748 | Fowler | Oct. 1, 1872 |
| 311,025 | Mitrucker | Jan. 20, 1885 |
| 1,199,596 | Noll | Sept. 26, 1916 |
| 1,257,638 | Robbins | Feb. 26, 1918 |
| 1,283,464 | Brown et al. | Nov. 5, 1918 |
| 1,372,933 | Buck | Mar. 29, 1921 |
| 2,229,908 | Wenneborg | Jan. 28, 1941 |
| 2,532,830 | Barnhart et al. | Dec. 5, 1950 |
| 2,660,149 | Jolly | Nov. 24, 1953 |
| 2,661,720 | Rysdon et al. | Dec. 8, 1953 |